(12) United States Patent  (10) Patent No.: US 8,576,370 B1
Sampica et al.  (45) Date of Patent: Nov. 5, 2013

(54) SYSTEMS AND METHODS FOR NONPLANAR LAMINATED ASSEMBLIES

(75) Inventors: James D. Sampica, Springville, IA (US); Gary N. Prior, Center Point, IA (US); Paul R. Nemeth, Springville, IA (US); Brian K. Smith, Marion, IA (US); Kyle P. Dotson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 655 days.

(21) Appl. No.: 12/827,989

(22) Filed: Jun. 30, 2010

(51) Int. Cl.
*G02F 1/1339* (2006.01)

(52) U.S. Cl.
USPC .......................................................... 349/155

(58) Field of Classification Search
USPC .......................................................... 349/155
See application file for complete search history.

(56) References Cited

U.S. PATENT DOCUMENTS

| | | | |
|---|---|---|---|
| 3,616,197 A | 10/1971 | Amberg et al. | |
| 3,851,758 A | 12/1974 | Makhijani et al. | |
| 4,025,688 A * | 5/1977 | Nagy et al. | 428/350 |
| 4,188,254 A | 2/1980 | Hemperly, Jr. | |
| 4,747,577 A | 5/1988 | Dimock | |
| 5,108,532 A | 4/1992 | Thein et al. | |
| 5,566,840 A | 10/1996 | Waldner et al. | |
| 5,592,288 A | 1/1997 | Sampica et al. | |
| 5,678,303 A | 10/1997 | Wichmann | |
| 5,918,517 A | 7/1999 | Malapert et al. | |
| 5,950,512 A | 9/1999 | Fields | |
| 6,128,066 A | 10/2000 | Yokozeki | |
| 6,388,724 B1 | 5/2002 | Campbell et al. | |
| 6,481,482 B1 | 11/2002 | Shimotomai | |
| 6,614,057 B2 | 9/2003 | Silvernail et al. | |
| 6,681,668 B1 | 1/2004 | Smirle | |
| 6,803,245 B2 | 10/2004 | Auch et al. | |
| 6,832,538 B1 | 12/2004 | Hwang | |
| 6,984,545 B2 | 1/2006 | Grigg et al. | |
| 6,998,648 B2 | 2/2006 | Silvernail | |
| 7,273,403 B2 | 9/2007 | Yokota et al. | |
| 7,381,110 B1 | 6/2008 | Sampica et al. | |
| 7,435,311 B1 | 10/2008 | Marzen et al. | |
| 7,452,258 B1 | 11/2008 | Marzen et al. | |
| 7,566,254 B2 | 7/2009 | Sampica et al. | |
| 7,814,676 B2 | 10/2010 | Sampica et al. | |
| 2002/0186343 A1 | 12/2002 | Liao et al. | |
| 2003/0089214 A1 | 5/2003 | Fukuta et al. | |

(Continued)

FOREIGN PATENT DOCUMENTS

| EP | 0711103 B1 | 5/1996 |
|---|---|---|
| JP | 01 210328 A | 8/1989 |

(Continued)

OTHER PUBLICATIONS

U.S. Appl. No. 12/009,472, filed Jan. 18, 2008, Sampica et al.

(Continued)

*Primary Examiner* — Lucy Chien
(74) *Attorney, Agent, or Firm* — Donna P. Suchy; Daniel M. Barbieri (57) ABSTRACT

A display assembly includes a display having a substantially planar surface configured to provide an image, a substrate having a nonplanar surface, and a shim provided between the display and the substrate. The shim has a first nonplanar surface and a second generally planar surface. The first nonplanar surface has a shape generally corresponding to the shape of the nonplanar surface of the substrate.

19 Claims, 6 Drawing Sheets

(56) References Cited

U.S. PATENT DOCUMENTS

| | | |
|---|---|---|
| 2003/0180528 A1 | 9/2003 | Flosenzier et al. |
| 2004/0125310 A1* | 7/2004 | Iwabuchi ............ 349/149 |
| 2005/0126679 A1 | 6/2005 | Kim |
| 2005/0249946 A1 | 11/2005 | Hsu et al. |
| 2006/0035060 A1 | 2/2006 | Koyama et al. |
| 2006/0245171 A1 | 11/2006 | Kim et al. |
| 2007/0297736 A1 | 12/2007 | Sherman et al. |
| 2009/0120572 A1 | 5/2009 | Sampica et al. |
| 2009/0120585 A1 | 5/2009 | Sampica et al. |
| 2009/0126872 A1 | 5/2009 | Sampica et al. |
| 2009/0183381 A1 | 7/2009 | Sampica et al. |
| 2009/0183615 A1 | 7/2009 | Sampica et al. |
| 2009/0186218 A1 | 7/2009 | Sampica et al. |
| 2010/0089630 A1* | 4/2010 | Weng et al. ............ 174/261 |

FOREIGN PATENT DOCUMENTS

| | | |
|---|---|---|
| JP | 05-200880 A | 8/1993 |
| JP | 05-293895 A | 11/1993 |
| JP | 06-051484 A | 2/1994 |
| JP | 09-057779 A | 3/1997 |
| JP | 10 156853 A | 6/1998 |
| JP | 10 244589 A | 9/1998 |
| JP | 2000 141388 A | 5/2000 |
| JP | 2004 233590 A | 8/2004 |
| JP | 2006 218658 A | 8/2006 |
| JP | 2006 334912 A | 12/2006 |
| JP | 2007 206559 A | 8/2007 |
| JP | 2008 238607 A | 1/2008 |
| WO | WO 2004/046230 | 6/2004 |

OTHER PUBLICATIONS

U.S. Appl. No. 12/009,482, filed Jan. 18, 2008, Sampica et al.
U.S. Appl. No. 12/786,169, filed May 24, 2010, Nemeth et al.
Kipp, D.O. (2004;2010). Plastic Material Data Sheets. MatWeb—Division of Automation Creation, Inc., Online version available at: http://www.knovel.com/web/portal/browse/display?_EXT_KNOVEL_DISPLAY_bookid=1023&VerticalID=0., 6 pages.
Walker, Geoff, GD—Itronix Dynavue Technology, The Ultimate Outdoor-Readable Touch-Screen Display, Rugged PC Review, pp. 1-4, United States of America.

* cited by examiner

SYSTEMS AND METHODS FOR NONPLANAR LAMINATED ASSEMBLIES

BACKGROUND

The present disclosure relates generally to the field of laminated assemblies, and more specifically, to laminated assemblies made up of substrates having one or more nonplanar surfaces.

There are many challenges associated with providing laminated assemblies, such as laminated display assemblies, where at least one surface of the display assembly is a nonplanar surface. Various embodiments disclosed in the present application may address and/or overcome these challenges.

SUMMARY

One embodiment relates to a display assembly comprising a display having a substantially planar surface configured to provide an image; a substrate having a nonplanar surface; and a shim provided between the display and the substrate; the shim having a first nonplanar surface and a second generally planar surface; wherein the first nonplanar surface has a shape generally corresponding to the shape of the nonplanar surface of the substrate.

Another embodiment relates to a method of making a display assembly, the method comprising providing a substrate having at least one nonplanar surface; providing a display having at least one generally planar surface; and coupling the nonplanar surface of the substrate to the planar surface of the display utilizing a shim provided between the substrate and the display, such that an image provided on the generally planar surface of the display is viewable through the shim and the substrate.

Another embodiment relates to a display assembly comprising a display having a first generally planar surface; a substrate having a nonplanar surface; a shim having a second generally planar surface and a nonplanar surface; and a thermoplastic adhesive bonding the nonplanar surface of the substrate to the nonplanar surface of the shim, the thermoplastic adhesive generally conforming to the shapes of the nonplanar surfaces of the shim and the substrate.

DETAILED DESCRIPTION OF EXEMPLARY EMBODIMENTS

Referring to FIGS. 1-4, a display assembly 10 is shown according to an exemplary embodiment. Display assembly 10 may be utilized in a wide variety of applications, from marine applications, to aerospace applications, to a number of different commercial, industrial, or other types of applications. For example, display assembly 10 may be utilized to provide a panoramic-type view of an image provided on a curved surface such as glass or another material. In some embodiments, display assembly 10 may be utilized to permit viewers to view images provided by displays such as liquid crystal displays through a curved glass surface, or substrate. As discussed in detail herein, one or more generally planar displays may be coupled, or laminated, to a curved substrate to provide a non-planar viewing surface.

Figure 1:
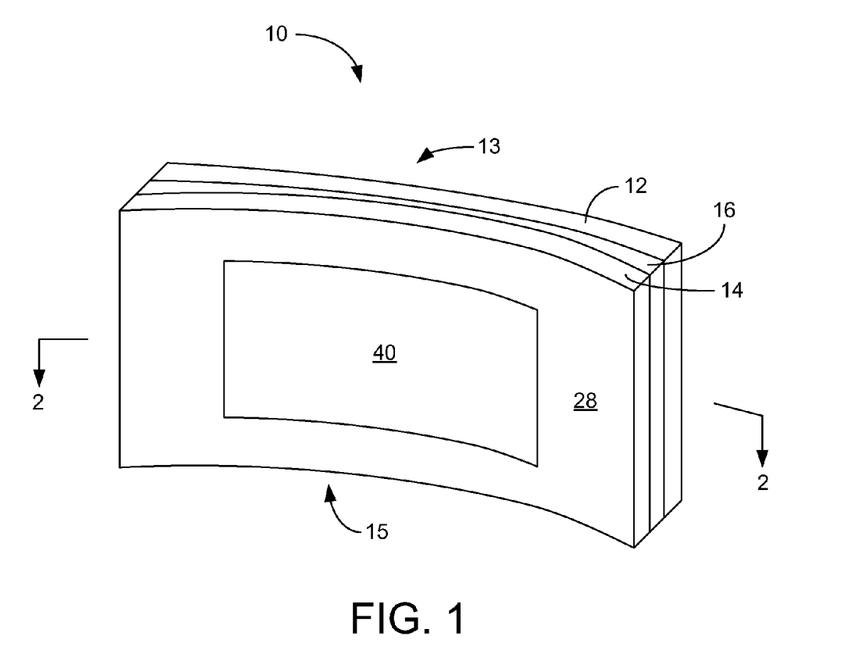
FIG. 1 is a perspective view of a display assembly according to an exemplary embodiment.

As shown in FIG. 1, according to an exemplary embodiment, display assembly 10 includes a display 12 (e.g., a liquid crystal display (LCD), a display module, a first substrate, etc.), a substrate 14 (a glass member, a portion of motherglass, a second substrate, etc.), and a shim 16 (e.g., a spacer, an interface member, an optical shim, etc.). It should be noted that while the embodiments disclosed herein generally refer to a "display," the teachings herein may equally extend to embodiments that do not include a display, but rather some other component or substrate. In some embodiments, an image 40 provided by display 12 is viewable through substrate 14 and shim 16. For example, display assembly 10 may have a nonplanar front surface 28 through or upon which one or more images 40 may be provided. In one embodiment, display 12, shim 16, and substrate 14 are arranged such that images provided by display 12 are viewable through substrate 14 and shim 16. As shown in FIG. 1, front surface 28 of substrate 14 may be nonplanar (e.g., concave, convex, irregularly contoured or shaped, etc.).

Figure 2:
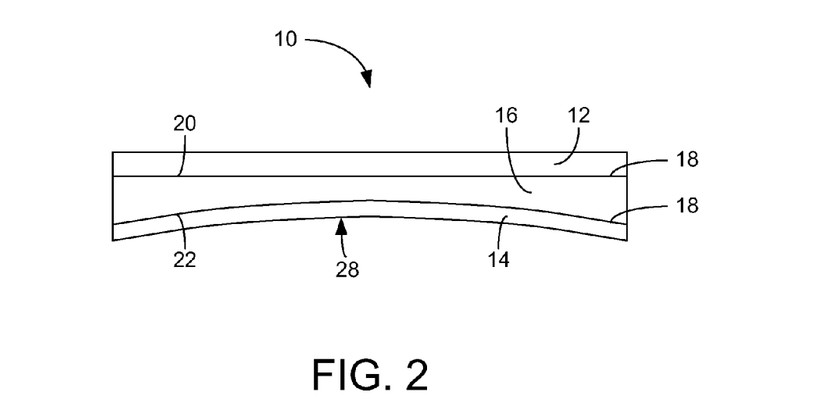
FIG. 2 is cross-sectional view of the display assembly of FIG. 1 taken along line 2-2 according to an exemplary embodiment.
Figure 3:
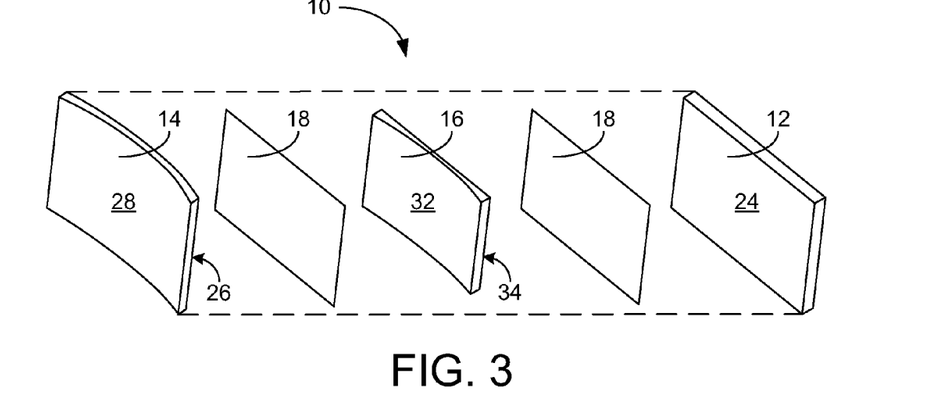
FIG. 3 is an exploded perspective view of the display assembly of FIG. 1 according to an exemplary embodiment.
Figure 4:
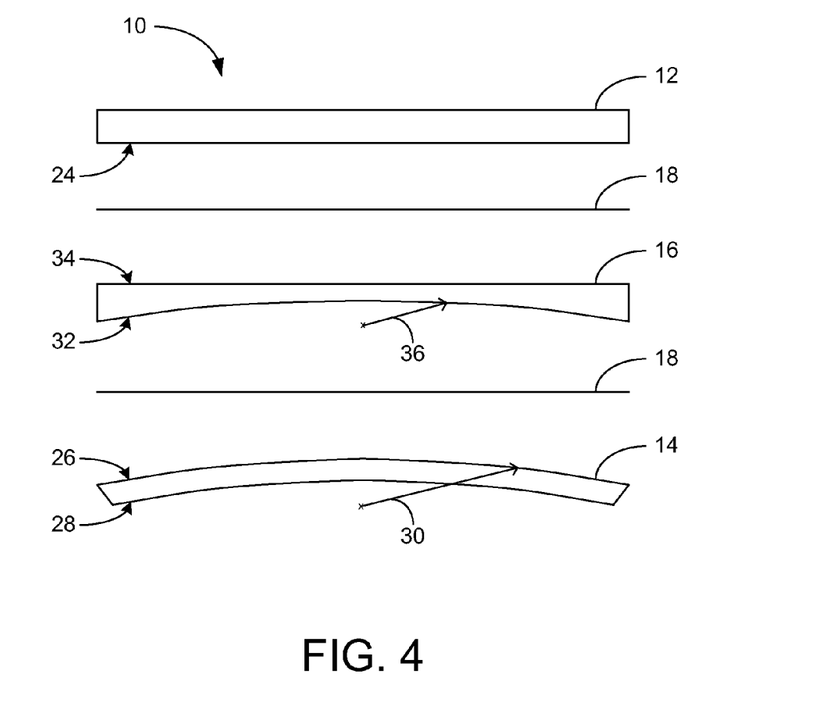
FIG. 4 is an exploded top view of the display assembly of FIG. 1 according to another exemplary embodiment.

Referring now to FIGS. 2-4, the construction of display assembly 10 is shown in greater detail according to an exemplary embodiment. According to one embodiment, display 12 is a generally planar member having at least one generally planar surface 24 (e.g., a front surface, a planar surface, etc.). Display 12 may be a liquid crystal display (LCD). Alternatively, display 12 may be a different type of display or module. As shown in FIGS. 3-4, the periphery of display 12 may be generally rectangular in shape, although according to various other embodiments, display 12 can take on other peripheral configurations (e.g., square, circular, elliptical, irregularly-shaped, and so on.). The other components of display assembly 10, such as adhesive 18, shim 16, and/or substrate 14, may have a peripheral configuration that generally corresponds to that of display 12. Alternatively, one or more components may have a differing peripheral configuration, for example, in the case of a display assembly having a single substrate to which is laminated multiple shims, adhesive layers, and/or displays (see FIG. 5).

Referring to FIGS. 1-4, shim 16 is provided adjacent display 12 and includes a generally planar surface 34 that faces planar surface 24 of display 12. Shim 16 further includes a nonplanar surface 32 that faces a nonplanar surface 26 of substrate 14. The nonplanar surfaces 26, 32 of substrate 14 and shim 16 have generally corresponding shapes (i.e., such that the interfacing or cofacing surfaces may be mated together in a complimentary fashion). For example, surface 26 may be a generally convex surface, such that shim 16 has a generally concave surface (e.g., surface 32) that faces surface 26 and a generally planar side that faces display 12. In this way, the thickness of shim 16 will vary across its width, with shim 16 being generally thickest at either end and thinnest at the midpoint of its width.

According to an exemplary embodiment, the difference between the radius of curvature 36 of surface 32 and the radius of curvature 30 of surface 26 is ideally less than approximately 0.031 inches (e.g., for a 15 inch diagonal display), and the planar surface 34 of shim 16 ideally has a total indicator reading (TIR) of no more than 0.020 inches after lamination. In some embodiments, the flatness of planar surface 34 of shim 16 may be improved by using a heated mechanical press to further flatten surface 34.

Figure 11:
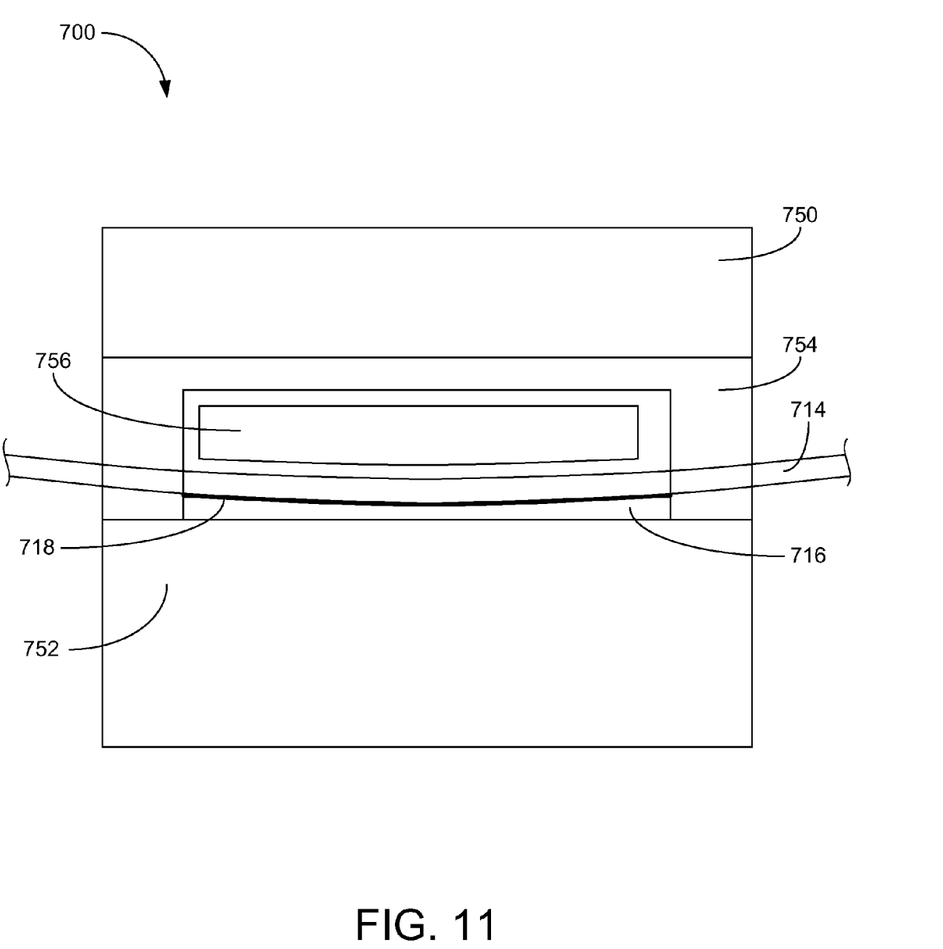
FIG. 11 is a front view of a device for making a display assembly according to an exemplary embodiment.

For example, as shown in FIG. 11, a device 700 (a press, a lamination device, etc.) is shown according to an exemplary embodiment. Device 700 include a top platen 750 and a bottom platen 752. One or both of top and bottom platens 750, 752 may be heated. Plattens 750, 752 are forced toward each other (e.g., by a press mechanism). A bladder insert 754 (e.g., a bladder cavity, etc.) is provided below top platen 750 and receives a bladder 756 (e.g., an air bladder, etc.). Substrate 714 and shim 716 are provided between top and bottom platens 750, 752, and an adhesive 718 (e.g., a thermoplastic adhesive, etc.) is provided between substrate 714 and shim 716. After platens 750, 752 clamp on bladder insert 754, bladder 756 may be inflated such that bladder 756 conforms to the shape of substrate 714 and forces substrate 714 and shim 716 toward each other. In some embodiments, bladder 756 may be replaced with a compliant member (e.g., a rubber or otherwise compliant pad or member, etc.). In some embodiments, laminating substrate 714 and shim 716 together prior to laminating a display to either component permits the use of elevated temperatures and/or pressures that may otherwise be unsuitable for use with a display.

Any suitable materials may be utilized for substrate 14 and shim 16. According to one embodiment, one or both of substrate 14 and shim 16 are made from a glass material (e.g., a chemically strengthened and/or tempered glass material, etc. are preferred in some embodiments). According to other embodiments, one or both of substrate 14 and shim 16 may be made of other suitable materials, such as a polymer material, etc. In some embodiments the radius of curvature of substrate 14 and shim 16 is at least 80 inches, for example, for a 15 inch diagonal display. Other radii may be appropriate dependent on the size and type of components utilized.

As shown in FIG. 2, an adhesive 18 may be provided between shim 16 and one or both of display 12 and substrate 14. According to one embodiment, adhesive 18 comprises a pressure sensitive adhesive (e.g., an optically clear PSA) that is provided between shim 16 and display 12 and between shim 16 and substrate 14. The arrangement of display 12, shim 16, substrate 14, and adhesive 18 is such that two bond lines 20, 22 are formed along the edges of display assembly 10. A first bond line 20 is formed between shim 16 and display 12, and a second bond line 22 is formed between shim 16 and substrate 14.

According to an alternative embodiment, a thermoplastic adhesive may be utilized in the construction of display assembly 10. For example, because of manufacturing tolerances and/or other factors, the nonplanar surface 26 of substrate 14 and the nonplanar surface 32 of shim 16 may deviate in shape in a sufficient amount such that a pressure sensitive adhesive may be inadequate to bond shim 16 to substrate 14 while providing adequate optical and other properties for display assembly 10. For example, according to one embodiment, the radii of curvature of surfaces 26 and 32 must be within approximately 0.031 inches of one another in order to utilize a pressure sensitive adhesive (e.g., a PSA having a thickness of 0.080 inches). Thus, to address situations where the difference in curvatures is greater than 0.031 inches or some other threshold, adhesive 18 may in some embodiments be a thermoplastic adhesive that is provided between shim 16 and substrate 14. As discussed in greater detail with respect to FIG. 10, the thermoplastic adhesive may be provided between shim 16 and substrate 14 and exposed to increased temperatures and/or pressures such that the thermoplastic adhesive tends to conform to one or both of surfaces 26 and 32 and provide suitable optical and other properties for display assembly 10 in spite of surface inconsistencies that may be present between shim 16 and substrate 14.

Any suitable thermoplastic adhesive may be utilized, including a thermoplastic polyurethane (TPU). According to one embodiment, the thickness of the thermoplastic adhesive is based upon the part-to-part dimensioned variation of the substrate and the shim. For example, the thickness of the thermoplastic adhesive may be selected such the thermoplastic adhesive has a thickness of approximately twice the dimensional surface variation between shim 16 and substrate 14. The thermoplastic adhesive may be chosen for specific and/or preferred temperature and/or pressure limitations or characteristics. According to various other embodiments, other types and thickness of adhesives may be used to suit a particular application.

Referring to FIGS. 3-4, according to one embodiment, front surface 28 and rear surface 26 of display assembly 10 may each take the shape of a curved portion of a cylinder. For example, display assembly 10 may have a top portion 13 and a bottom portion 15 (see FIG. 1), such that the radius of curvature 30 of rear surface 26 of substrate 14 is generally constant along the height of surface 26 between top portion 13 and bottom portion 15. Similarly, front surface 32 of shim 16 may have a generally constant radius of curvature 36 along the height of shim 16 between top portion 13 and bottom portion 15. While FIGS. 1-4 generally illustrate display assembly 10 as having a shape conforming to the curved portion of a cylinder, other nonplanar shapes may be utilized, as discussed in detail with respect to FIGS. 7-8.

Figure 7:
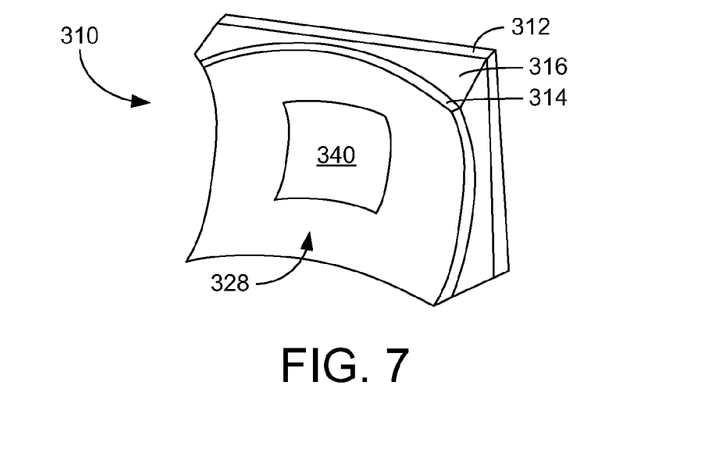
FIG. 7 is a perspective view of a display assembly according to another exemplary embodiment.

For example, referring to FIG. 7, a display assembly 310 is shown according to an exemplary embodiment. As shown in FIG. 7, display assembly 310 includes a display 312, a shim 316, and a substrate 314. An image 340 is provided upon surface 328 of substrate 314. Display assembly 310 is similar to display assembly 10 shown in FIGS. 1-4 except that substrate 314 is in the shape of a portion of a sphere (rather than in the shape of a portion of a cylinder, as shown in FIGS. 1-4). As such, display assembly 310 may have a generally constant radius of curvature.

Figure 8:
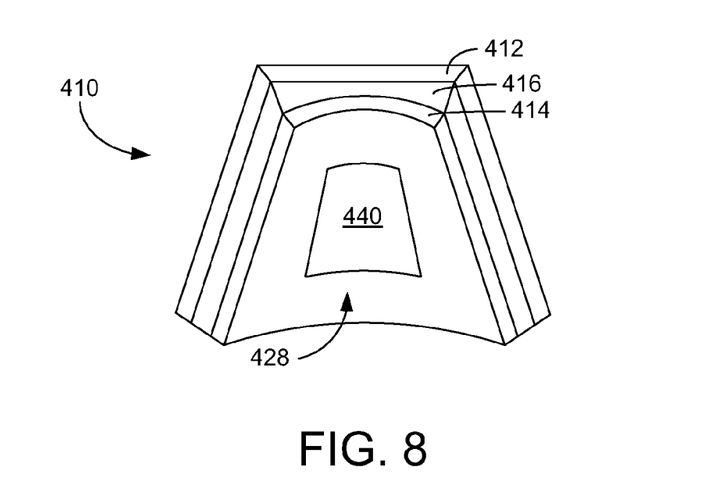
FIG. 8 is a perspective view of a display assembly according to another exemplary embodiment.

Referring to FIG. 8, a display assembly 410 is shown according to an exemplary embodiment. As shown in FIG. 8, display assembly 410 includes a display 412, a shim 416, and a substrate 414. An image 440 is provided on front surface 428 of substrate 414. Display assembly 410 is similar to display assembly 10 shown in FIGS. 1-4 except that substrate 414 is generally in the shape of a curved portion of a cone (rather than in the shape of a portion of a cylinder, as shown in FIGS. 1-4). As such, display assembly 410 may have a radius of curvature that increases along the height of display assembly 410 from the top portion of display assembly 410 to the bottom portion of display assembly 410.

It should be noted that while exemplary embodiments of specific nonplanar surfaces have been provided herein, the teachings herein may extend to a wide variety of other nonplanar surfaces not specifically discussed herein, such as wavy surfaces, elliptical surfaces, irregularly-contoured surfaces, and the like. All such embodiments are understood to be within the scope of the present disclosure.

Figure 5:
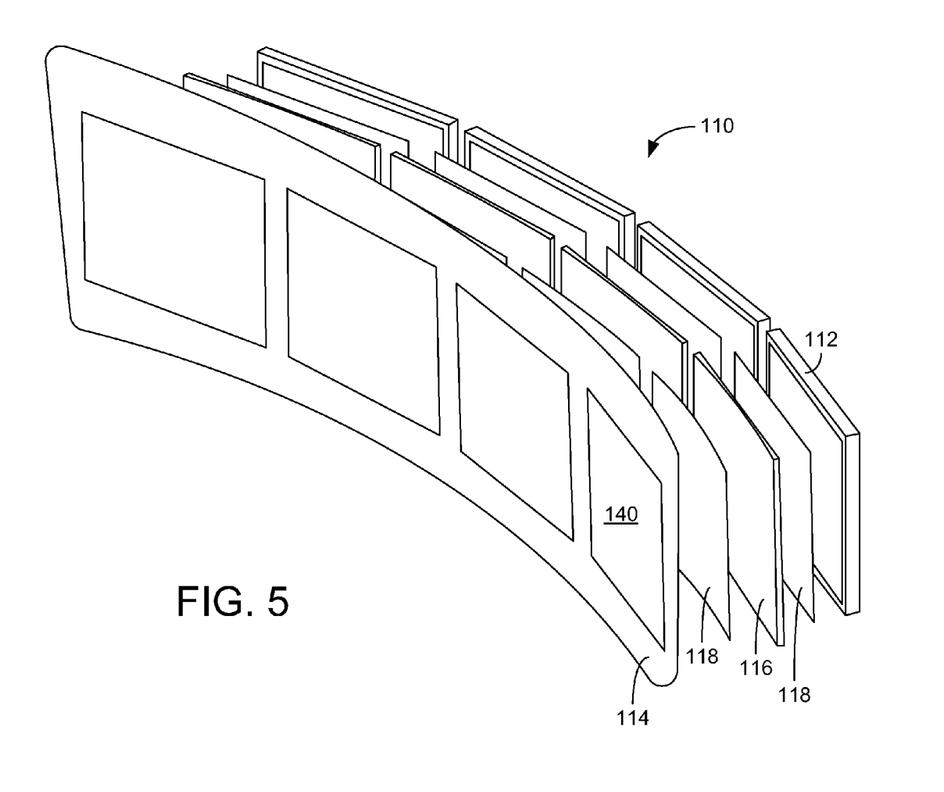
FIG. 5 is an exploded perspective view of a display assembly having multiple displays according to an exemplary embodiment.

In addition to variously-sized and/or contoured display assemblies, the teachings herein further extend to embodiments having more than one display, shim, substrate, or other component of the various display assemblies disclosed herein. For example, referring to FIG. 5, a display assembly 110 is shown according to an exemplary embodiment. Display assembly 110 may include a single substrate 114, and multiple shims 116 and displays 112. Further, multiple pieces of pressure sensitive adhesive material 118 may be utilized. As shown in FIG. 5, display assembly 110 may provide a panoramic view of one or more images 140 displayed upon a front surface 128 of substrate 114. The number of displays, shims, etc. utilized in a single display assembly 110 may vary according to the particular application, such that while FIG. 5 illustrates utilizing four separate displays 112, more or fewer displays 112 may be utilized according to various exemplary embodiments.

Figure 6:
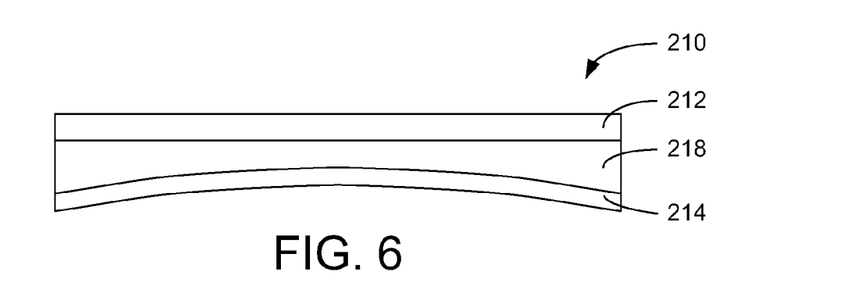
FIG. 6 is a top view of a display assembly according to another exemplary embodiment.

In further embodiments, display assemblies may be provided without one or more of the individual components of the display assembly. For example, referring to FIG. 6, a display assembly 210 is shown according to an exemplary embodiment. Display assembly 210 includes a display 212 and a substrate 214, such that display assembly 210 does not include a shim, or spacer, between display 212 and 214. Rather, according to an exemplary embodiment, an adhesive 218 (e.g., a liquid adhesive, etc.) may be utilized to fill the space between the interfacing surfaces of display 212 and substrate 214. Adhesive 218 may be an optical adhesive, such that adhesive 218 is substantially transparent and permits images provided by display 212 to be viewed through substrate 214.

Figure 9:
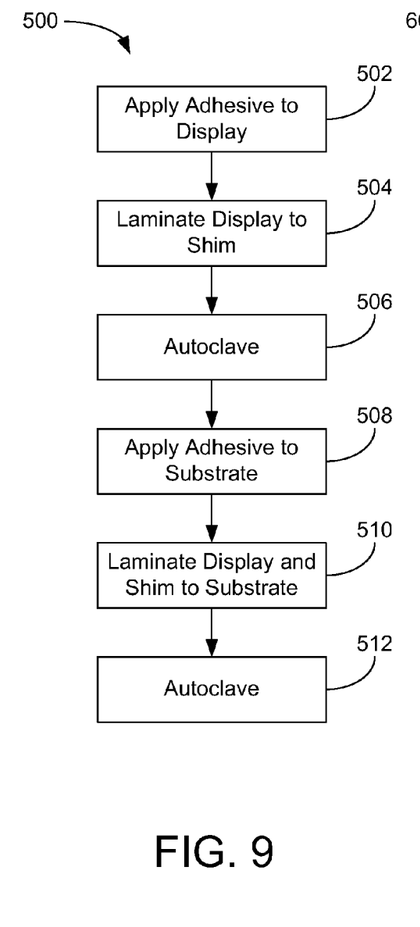
FIG. 9 is a block diagram of a method of making a display assembly according to an exemplary embodiment.

Various methods may be utilized to make the various display assemblies disclosed herein. Referring to FIG. 9, a block diagram of a method 500 of making a display assembly is shown according to an exemplary embodiment. First, an adhesive is applied to a display (step 502). For example, adhesive 18, such as a pressure sensitive adhesive, may be applied to a display such as display 12. Next, the display and shim are aligned and laminated together using the adhesive (step 504). In one embodiment, the display (e.g., display 12) and the shim (e.g., shim 16) may be laminated using a direct dry film lamination process, such as that disclosed in co-pending U.S. application Ser. No. 12/009,375, filed Jan. 18, 2008, or in co-pending U.S. application Ser. No. 12/009,482, filed Jan. 18, 2008, both of which are incorporated by reference herein in their entireties.

Referring further to FIG. 9, the display/shim lamination may be autoclaved (step 506) to fully bond the surfaces of and remove any air bubbles from the display/shim lamination. Any suitable autoclave process may be utilized as part of step 506. In some embodiments, the increased temperatures of the autoclave process may further act to improve the optical or other properties of the display assembly. Next, an adhesive is applied to the nonplanar surface of the substrate (step 508). In one embodiment, a pressure sensitive adhesive is applied to a surface such as nonplanar surface 26 (step 508), and the display/shim lamination may be laminated with the substrate (step 510) using, for example, the dry film lamination process indicated above with respect to step 504. Finally, the complete display assembly (e.g., display assembly 10) may be autoclaved to fully bond the surfaces of and remove any air bubbles from the completed assembly (step 512).

It should be noted that according to one embodiment, the method illustrated in FIG. 9 is suitable when the components of display assembly 10 are within certain dimensional tolerances of each other or within certain threshold tolerances (e.g., a total indicator reading tolerance for a planar surface, etc.), including the various dimensional tolerances and/or ranges disclosed herein. If the dimensions of one or more components of the display assembly are outside of certain acceptable ranges, tolerances, etc., alternative methods of assembly than those disclosed in FIG. 9 may be utilized.

Figure 10:
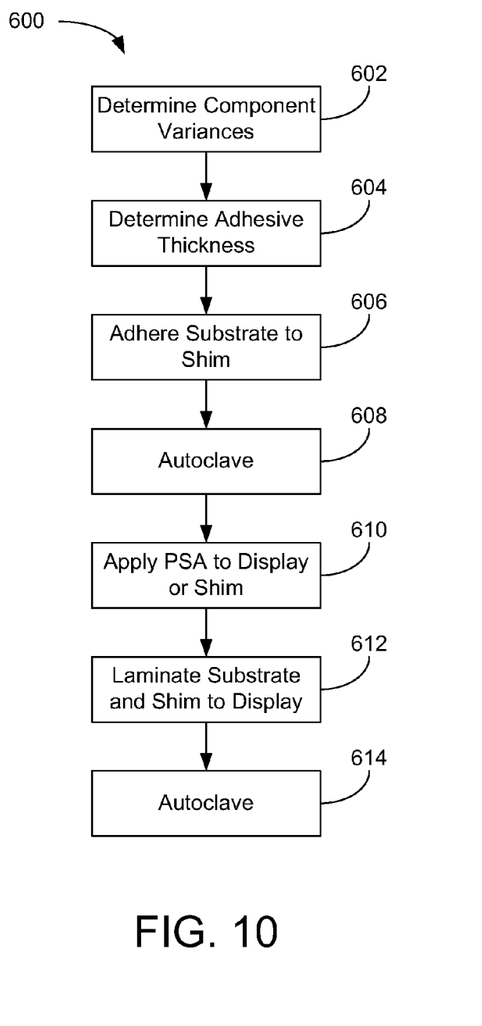
FIG. 10 is a block diagram of a method of making a display assembly according to another exemplary embodiment.

For example, referring to FIG. 10, a block diagram of a method 600 of making a display assembly is shown according to an exemplary embodiment. In one embodiment, method 600 may be utilized when the dimensions of one or more components (e.g., shim 16, substrate 14, etc.) of display assembly 10 fall outside of an acceptable range, tolerance, etc. As shown in FIG. 10, the variance between the components is first determined (step 602). According to one embodiment, this may include identifying the difference in curvature between the nonplanar surfaces of the shim and the substrate. According to other embodiments, other dimensional variances may be determined. Next, a thickness for a thermoplastic adhesive is determined based on the dimensional variances (step 604). According to one embodiment, a polyurethane polymer adhesive is utilized with a thickness of approximately twice the dimensional variance determined in step 602. Next, the shim and substrate are adhered together using the thermoplastic adhesive (step 606). In one embodiment, the shim and substrate are laminated together using a vacuum bag lamination process, and/or using any of the processes disclosed in the copending U.S. Applications mentioned above. According to various alternative embodiments, other lamination processes may be used. In general, the shim, substrate, and thermoplastic adhesive may be exposed to increased temperatures and/or pressures to activate the adhesive and ensure a proper bond between the shim and the substrate. In some embodiments, an additional flat plate may be temporarily installed to the planar surface of the shim to minimize warping of the planar surface during the vacuum bagging lamination process. Furthermore, a device such as that shown in FIG. 11 may be utilized to laminate the components.

Referring further to FIG. 10, the shim/substrate lamination may be autoclaved (step 608) to fully bond the surfaces of and remove any air bubbles from the shim/substrate lamination. Any suitable autoclave process may be utilized as part of step 608. Next, an adhesive is applied to the nonplanar surface of the substrate or the nonplanar surface of the shim (step 610). In one embodiment, a pressure sensitive adhesive is applied to a surface such as nonplanar surface 26 or 32, and the shim/substrate lamination may be laminated with the display (step 612) using, for example, the dry film lamination process indicated above with respect to step 504 of FIG. 5. Finally, the complete display assembly (e.g., display assembly 10) may be autoclaved to fully bond the surfaces of and remove any air bubbles from the completed assembly (step 614).

According to an exemplary embodiment, the various display assemblies disclosed herein provide certain optical properties for the display assemblies. For example the adhesive and shim may be substantially transparent to permit viewing of images provided by the display through the shim, adhesive, and substrate. In one embodiment, the adhesive and shim are configured to provide for at least ninety percent, or alternatively, at least ninety-five percent, optical transmission, less than 10 nanometers of birefringence, and have a refractive index (RI) in the range of 1.47 to 1.51. The adhesive, shim, and other components of the display assemblies provided herein may be configured to provide for differing optical characteristics according to other alternative embodiments.

It should be noted that while the embodiments herein generally illustrate a shim that provides an interface between a nonplanar surface of a substrate and a planar surface of a display, the teachings herein should not be limited in this context, such that, for example, the shim and display may both have nonplanar surfaces and the shim may be utilized as an interfacing member having surfaces generally corresponding to both nonplanar surfaces. Further, the relative curvatures, material thicknesses, and the like of the components of the display assemblies provided in the drawings are for illustrative purposes, and should not be construed as limiting.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is important to note that the construction and arrangement of the elements of the display assembly as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A display assembly comprising:
   a display having a substantially planar surface configured to provide an image;
   a substrate having a nonplanar surface; and
   a shim provided between the display and the substrate, the shim having a first nonplanar surface and a second substantially planar surface;
   wherein the first nonplanar surface of the shim has a shape generally corresponding to the shape of the nonplanar surface of the substrate;
   wherein the nonplanar surface of the substrate has a height extending from a top edge to a bottom edge and a substantially constant curvature along the height.

2. The display assembly of claim 1, further comprising an adhesive material provided between the nonplanar surface of the substrate and the first nonplanar surface of the shim.

3. The display assembly of claim 2, wherein the adhesive comprises a pressure sensitive adhesive.

4. The display assembly of claim 2, wherein the adhesive comprises a thermoplastic adhesive configured to at least partially conform to the shape of the nonplanar surface of the substrate and the shape of the first nonplanar surface of the shim.

5. The display assembly of claim 1, wherein a radius of curvature of the nonplanar surface of the substrate is at least approximately 80 inches.

6. The display assembly of claim 1, wherein the display comprises a liquid crystal display (LCD).

7. The display assembly of claim 1, wherein the display, the substrate, and the shim are arranged such that an image provided by the display is viewable through the substrate and the shim.

8. A method of making a display assembly, the method comprising:
   providing a substrate having at least one curved surface;
   providing a display having at least one generally planar surface;
   providing a transparent shim having a curved surface and a planar surface opposite the curved surface; and
   coupling the curved surface of the shim to the curved surface of the substrate and coupling the planar surface of the shim to the planar surface of the display such that an image provided on the generally planar surface of the display is viewable through the shim and the substrate.

9. The method of claim 8, further comprising providing an adhesive between the curved surface of the substrate and the shim and between the generally planar surface of the display and the shim.

10. The method of claim 9, wherein the adhesive comprises a pressure sensitive adhesive.

11. The method of claim 9, wherein providing an adhesive between the curved surface of the substrate and the shim comprises providing a thermoplastic adhesive between the curved surface of the substrate and the shim, the thermoplastic adhesive conforming at least partially to the shapes of the curved surface of the substrate and the shim.

12. The method of claim 8, wherein coupling the substrate and the display to the shim comprises utilizing a dry film lamination process and a pressure sensitive adhesive.

13. The method of claim 8, wherein the display comprises a liquid crystal display (LCD).

14. The method of claim 8, wherein the display comprises a plurality of displays.

15. A display assembly comprising:
   a display having a first generally planar surface;
   a substrate having a nonplanar surface;
   a shim having a second generally planar surface and a nonplanar surface; and
   a thermoplastic adhesive bonding the nonplanar surface of the substrate to the nonplanar surface of the shim, the thermoplastic adhesive generally conforming to the shapes of the nonplanar surfaces of the shim and the substrate;
   wherein at least one of the shim and the substrate comprises a transparent glass material.

16. The display assembly of claim 15, further comprising a pressure sensitive adhesive provided between the first generally planar surface and the second generally planar surface.

17. The display assembly of claim 15, wherein the first generally planar surface of the display is configured to provide an image viewable through the substrate, the shim, and the thermoplastic adhesive.

18. The display assembly of claim 15, wherein the display comprises a liquid crystal display (LCD).

19. The method of claim 8, wherein at least one of the shim and the substrate comprises a transparent glass material.

* * * * *